(12) United States Patent
Hayashi

(10) Patent No.: US 8,229,157 B2
(45) Date of Patent: Jul. 24, 2012

(54) INFORMATION PROCESSING APPARATUS SETTING ADDITIONAL INFORMATION ADDED TO IMAGE DATA, AND CONTROL METHOD THEREOF, AND COMPUTER READABLE STORAGE MEDIUM

(75) Inventor: Junichi Hayashi, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 1112 days.

(21) Appl. No.: 11/923,042

(22) Filed: Oct. 24, 2007

(65) Prior Publication Data

US 2008/0118100 A1     May 22, 2008

(30) Foreign Application Priority Data

Nov. 20, 2006  (JP) .................................. 2006-313599

(51) Int. Cl.
    *G06K 9/00*  (2006.01)

(52) U.S. Cl. ........................................................ 382/100

(58) Field of Classification Search .................. None
    See application file for complete search history.

(56) References Cited

U.S. PATENT DOCUMENTS

| | | | |
|---|---|---|---|
| 6,675,017 B1 * | 1/2004 | Zellner et al. | 455/456.1 |
| 6,813,395 B1 * | 11/2004 | Kinjo | 382/305 |
| 6,889,324 B1 * | 5/2005 | Kanai et al. | 713/176 |
| 7,181,227 B2 * | 2/2007 | Wilson et al. | 455/456.1 |
| 7,403,221 B2 | 7/2008 | Yamazaki et al. | 348/211.2 |
| 7,457,629 B2 * | 11/2008 | Jang et al. | 455/456.3 |
| 2006/0025071 A1 * | 2/2006 | Yamazaki et al. | 455/3.06 |
| 2007/0297683 A1 * | 12/2007 | Luo et al. | 382/224 |

FOREIGN PATENT DOCUMENTS

| | | |
|---|---|---|
| CN | 1720527 A | 1/2006 |
| JP | 10-056609 | 2/1998 |
| JP | 2000-101884 | 4/2000 |
| JP | 2000-215379 | 8/2000 |
| JP | 2001-305640 A | 11/2001 |
| JP | 2002-215029 | 7/2002 |
| JP | 2006-279518 | 10/2006 |

OTHER PUBLICATIONS

Notification of First Office Action issued on Jan. 8, 2010 by the State Intellectual Property Office of People's Republic of China in the corresponding Chinese Patent Application No. 20071018739X (11 pages)—Translation included.

Japanese Office Action dated Oct. 14, 2011, in counterpart Japanese Application No. 2006-313599, and English-language translation thereof.

* cited by examiner

*Primary Examiner* — Brian P Werner
*Assistant Examiner* — Tahmina Ansari
(74) *Attorney, Agent, or Firm* — Fitzpatrick, Cella, Harper & Scinto

(57) ABSTRACT

An apparatus that inputs image data, adds additional information to the image data, and outputs the image data. The apparatus also acquires position information indicating a geographical position of the information processing apparatus, sets an on state in which position information acquisition processing is executed and sets an off state in which position information acquisition processing is not executed, and determines whether position information can be acquired by the acquisition means. The apparatus includes a setting device for 1) when the off state is set for position information acquisition processing, setting information to that effect as the additional information, 2) when it is determined that the position information cannot be acquired, setting information to that effect as the additional information, and 3) when position information acquisition processing is on and position information can be acquired, setting the acquired position information as the additional information.

22 Claims, 13 Drawing Sheets

INFORMATION PROCESSING APPARATUS SETTING ADDITIONAL INFORMATION ADDED TO IMAGE DATA, AND CONTROL METHOD THEREOF, AND COMPUTER READABLE STORAGE MEDIUM

BACKGROUND OF THE INVENTION

1. Field of the Invention

The present invention relates to an information processing apparatus which inputs image data, adds additional information to the input image data, and outputs that image data, a control method thereof, and a computer readable storage medium.

2. Description of the Related Art

A digital camera which acquires GPS information upon image capturing, and adds the acquired GPS information as metadata has been proposed. Using such a digital camera, the locations where images were captured can be easily confirmed later.

However, since it is easy to edit the GPS information added to the image data, if the GPS information is used for security applications that authenticate the image capturing positions of image data, its evidential capacity is poor.

In order to solve such problem, Japanese Patent Laid-Open No. 2000-215379 has proposed a technique that enhances the evidential capacity of metadata including GPS information and image data. According to Japanese Patent Laid-Open No. 2000-215379, a digital signature is generated and added to metadata including GPS information, and image data upon image capturing. If the metadata or image data has been altered after image capturing, the alteration can be detected by verifying the added digital signature.

On the other hand, GPS information is normally received as a radio wave, and is acquired based on the received radio wave. Hence, if the radio wave receiving condition is poor, since GPS information cannot be acquired, it is difficult to add GPS information to image data.

In order to solve such problem, Japanese Patent Laid-Open No. 10-56609 has proposed a technique that can add GPS information even at an image capturing position where the radio wave receiving condition is bad. According to Japanese Patent Laid-Open No. 10-56609, GPS information acquired at an image capturing position where the radio wave receiving condition is good is held in advance inside a camera. The radio wave receiving condition is checked at the time of image capturing, and when the receiving condition is bad, the GPS information held inside the camera is added in place of that upon image capturing. In this way, even when an image is to be captured at a place where the radio wave receiving condition is bad, the GPS information can be easily added to that image.

However, with the related art, when the GPS information is not added to the captured image data, the following problem occurs. That is, it is difficult to identify whether the GPS information could not be acquired due to a bad radio wave receiving condition at the time of image capturing or the user did not set the camera to add GPS information. Thus, for example, the photographer can easily set not to record an image capturing position according to his or her intention, and the related art is not suited to security applications that force to record the image capturing position and authenticate it.

When the radio wave receiving condition is not good at the time of image capturing, GPS information acquired at an image capturing position where the radio wave receiving condition is good is held in advance inside the camera, and can be added to an image as that upon image capturing. For this reason, the actual image capturing position may have a large difference from the position where the GPS information is added to an image, and the related art is not suited to security application that authenticate the image capturing position.

SUMMARY OF THE INVENTION

The present invention has been made in consideration of the aforementioned problems, and has as its object to provide an information processing apparatus which can accurately and securely acquire input position information of an image, a control method thereof, and a computer readable storage medium.

According to the first aspect of the present invention, an information processing apparatus which inputs image data, adds additional information to the input image data, and outputs the image data, comprising: input means for inputting image data; acquisition means for acquiring position information indicating a geographical position of the information processing apparatus; setting means for setting whether or not to execute position information acquisition processing by the acquisition means; determination means for determining whether or not to acquire position information by the acquisition means; additional information setting means for setting additional information to be added to the image data input by the input means in accordance with a setting state by the setting means, and the determination result of the determination means; and addition means for adding the additional information set by the additional information setting means to the image data.

In a preferred embodiment, the apparatus further comprises signing means for executing signing processing to the image data to which the additional information is added by the addition means.

In a preferred embodiment, when the setting means sets that the position information acquisition processing is not executed, the additional information setting means sets information that advises accordingly as the additional information.

In a preferred embodiment, when the determination means determines that the position information cannot be acquired, the additional information setting means sets information that advises accordingly as the additional information.

In a preferred embodiment, when the setting means sets that the position information acquisition processing is executed, and the determination means determines that the position information can be acquired, the additional information setting means sets the position information acquired by the acquisition means as the additional information.

In a preferred embodiment, the apparatus further comprises: first time acquisition means for acquiring a first time at which the input means inputs the image data; and measurement means for measuring a time period elapsed from the first time, wherein the additional information setting means sets the additional information to be added to the image data input by the input means in accordance with the setting sate by the setting means, the determination result of the determination means, and a measurement result by the measurement means.

In a preferred embodiment, the apparatus further comprises second time acquisition means for acquiring a second time at which the acquisition means acquires the position information, wherein when the determination means determines that the position information can be acquired, the measurement means calculates a difference between the first time and the second time, and outputs the calculated value as a measurement result.

In a preferred embodiment, the apparatus further comprises second time acquisition means for acquiring a second time after the determination processing by the determination means, wherein when the determination means determines that the position information cannot be acquired, the measurement means calculates a difference between the first time and the second time, and outputs the calculated value as a measurement result.

In a preferred embodiment, when the determination means determines that the position information cannot be acquired, the acquisition means repetitively executes reception of the position information.

In a preferred embodiment, the further comprises: first time acquisition means for acquiring a first time at which the input means inputs the image data; and second time acquisition means for acquiring a second time at which the acquisition means acquires the position information, wherein the additional information setting means sets, as the additional information, the position information acquired by the acquisition means, and time information according to the first time and the second time.

According to the second aspect of the present invention, an information processing apparatus for verifying reliability of the position information in the above information processing apparatus, comprising: input means for inputting the image data added with the additional information; determination means for determining whether or not signature data is added to the image data; verification means for executing verification processing of the signature data; calculation means for calculating a difference between the first time and the second time using time information included in the additional information; reliability determination means for determining reliability of the position information in accordance with a determination result of the determination means, a verification result of the verification means, and a calculation result of the calculation means; and display means for displaying a determination result of the reliability determination means.

According to the third aspect of the present invention, a method of controlling an information processing apparatus, which inputs image data, adds additional information to the input image data, and outputs the image data, comprising: an input step of inputting image data; an acquisition step of acquiring position information indicating a geographical position of the information processing apparatus; a setting step of setting whether or not position information acquisition processing is executed in the acquisition step; a determination step of determining whether or not position information can be acquired in the acquisition step; an additional information setting step of setting additional information to be added to the image data input in the input step in accordance with a setting state in the setting step, and the determination result in the determination step; and an addition step of adding the additional information set in the additional information setting step to the image data.

According to the fourth aspect of the present invention, a computer readable storage medium for storing a program for making a computer execute control of an information processing apparatus, which inputs image data, adds additional information to the input image data, and outputs the image data, the program making the computer execute: an input step of inputting image data; an acquisition step of acquiring position information indicating a geographical position of the information processing apparatus; a setting step of setting whether or not position information acquisition processing is executed in the acquisition step; a determination step of determining whether or not position information can be acquired in the acquisition step; an additional information setting step of setting additional information to be added to the image data input in the input step in accordance with a setting state in the setting step, and the determination result in the determination step; and an addition step of adding the additional information set in the additional information setting step to the image data.

Further features of the present invention will become apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
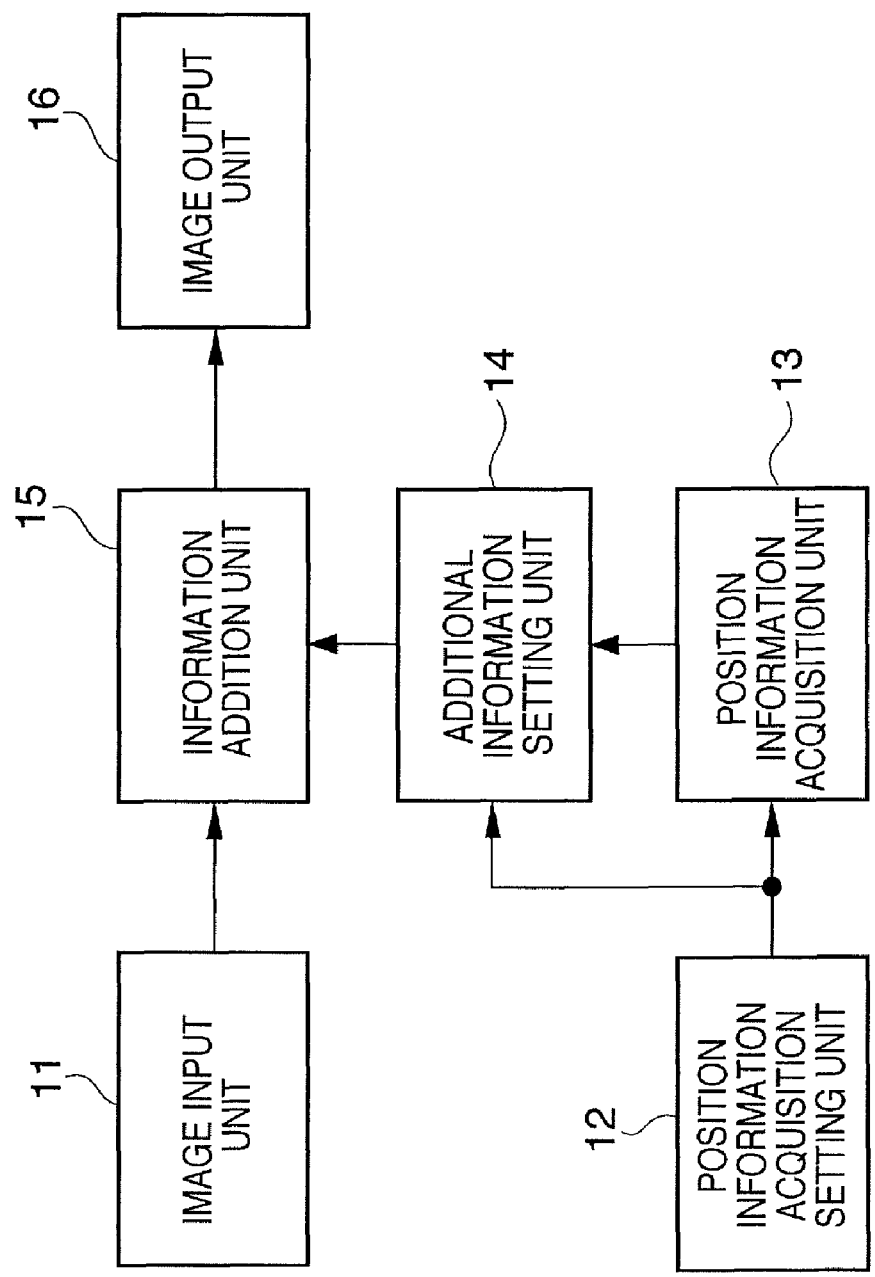
FIG. 1 is a block diagram showing an example of an image capturing apparatus according to the first embodiment of the present invention.

FIG. 1 is a block diagram showing an example of an image capturing apparatus according to the first embodiment of the present invention.

As shown in FIG. 1, an image capturing apparatus (information processing apparatus) of the first embodiment comprises an image input unit 11, position information acquisition setting unit 12, position information acquisition unit 13, additional information setting unit 14, information addition unit 15, and image output unit 16. The image capturing apparatus is implemented as, for example, a digital camera or the like. This image capturing apparatus comprises components such as a CPU, RAM, ROM, shutter button, display, and the like, which are mounted on a general image capturing apparatus such as a digital camera or the like, in addition to the components shown in FIG. 1.

The image input unit 11 comprises an optical sensor such as a CCD (Charge Coupled Device) or the like, a microprocessor which controls an optical system, the optical system, and the like. The image input unit 11 acquires a video signal generated by the optical system and optical sensor as image information, and forms image data. The image input unit 11 outputs the formed image data to the information addition unit 15 as an image file together with metadata associated with the image data. Details of this image file will be described later.

Note that in the first embodiment, still image data is input as image data. However, the present invention is not limited to such specific data, and can be applied to various other contents such as moving image data, audio data, and/or document data.

The position information acquisition setting unit 12 sets whether or not the position information acquisition unit 13 executes position information acquisition processing. The position information acquisition setting unit 12 is implemented as an input interface (not shown) such as a touch panel, physical keys and buttons, or the like. The user of the image capturing apparatus can set via this input interface (operation window) whether or not to execute the position information acquisition processing. When the position information acquisition unit 13 executes the position information acquisition processing, that is, when a position information acquisition function is executed, a flag ON (position information acquisition function ON information) indicating it is set. On the other hand, if the position information acquisition function is not executed, a flag OFF (position information acquisition function OFF information) indicating it is set.

The position information acquisition setting unit 12 notifies the position information acquisition unit 13 and additional information setting unit 14 of its setting state. This notification can be implemented in such a manner that the position information acquisition setting unit 12 holds the flag (ON/OFF) indicating the setting state on a storage medium (e.g., a RAM), and the position information acquisition unit 13 and additional information setting unit 14 confirm the flag.

The position information acquisition unit 13 attempts to acquire position information in accordance with the setting state by the position information acquisition setting unit 12. In the first embodiment, a UPS system which receives a radio wave from a satellite (GPS satellite), and acquires position information (GPS information (geographical position information)) based on the received radio wave will be described as an example. However, the present invention is not limited to such specific system, and can be applied to various other systems such as a system that receives a radio wave from a base station of a mobile phone, PHS phone, or the like, or an access point of a wireless LAN, and acquires position information.

The position information acquisition unit 13 detects a radio wave receiving condition. When the receiving condition is good, the unit 13 acquires position information (GPS information) from the received radio wave, and outputs the acquired position information to the additional information setting unit 14. On the other hand, when the receiving condition is not good, the unit 13 outputs information (position information acquisition NG information) indicating that position information cannot be acquired to the additional information setting unit 14.

Note that whether or not the receiving condition is good is determined as follows. For example, when the reception sensitivity is equal to or higher than a predetermined value, it is determined that the receiving condition is good; otherwise, it is determined that the receiving condition is not good. In particular, in the present invention, when the reception sensitivity is equal to or higher than the predetermined value, that is, when the receiving condition is good, it is determined that position information can be acquired. On the other hand, when the reception sensitivity is less than the predetermined value, that is, when the receiving condition is not good, it is determined that the position information cannot be acquired.

The additional information setting unit 14 sets additional information based on the setting state by the position information acquisition setting unit 12, and the position information or position information acquisition NG information by the position information acquisition unit 13, and outputs the set additional information to the information addition unit 15. Details about the setting method in the additional information setting unit 14 will be described later.

The information addition unit 15 adds the additional information set by the additional information setting unit 14 to the image file input from the image input unit 11 in accordance with a predetermined format, and outputs the image file added with the additional information.

The image output unit 16 outputs the image file added with the additional information to a predetermined storage medium (e.g., a memory (Smart Media, CompactFlash™, etc.)), or transmits it to a predetermined host via a wired or wireless communication unit.

The details of the format of an image file of the first embodiment will be described below with reference to FIG. 2.

Figure 2:
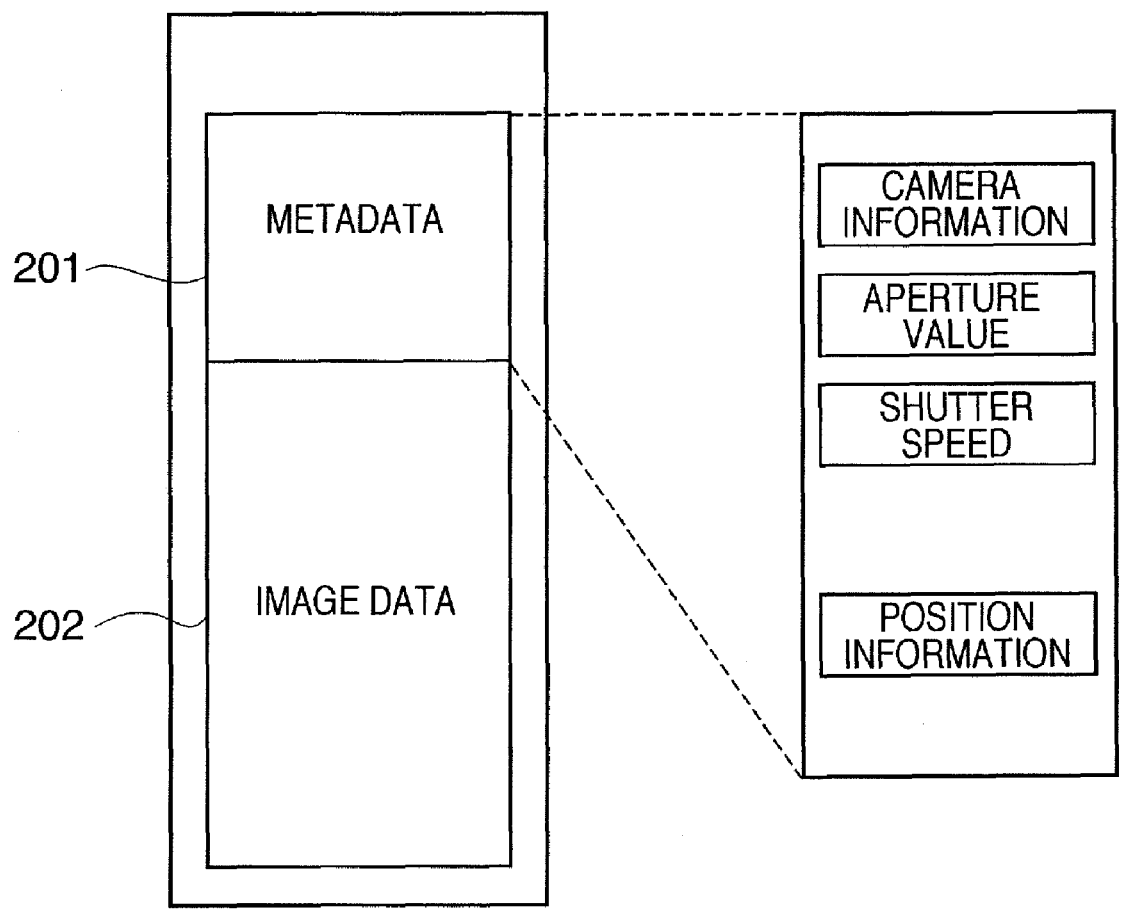
FIG. 2 is a view for explaining the format of an image file according to the first embodiment of the present invention.

FIG. 2 is a view for explaining the format of an image file according to the first embodiment of the present invention.

As shown in FIG. 2, the format of an image file of the first embodiment is configured by a metadata field 201 and image data field 202. Note that the metadata field 201 records a series of pieces of information associated with image data such as camera information, an aperture value, a shutter speed, and the like, as shown in FIG. 2. On the other hand, the image data field 202 records input image data itself.

In the first embodiment, the type of data to be recorded in the image data field 202 is not particularly limited. As the type of data, lossy compression encoded data such as JPEG or the like, lossless compression encoded data such as JPEG-LS or the like, and/or data which is not compressed such as bitmap data or the like can be used.

In the first embodiment, the information addition unit 15 records the additional information set by the additional information setting unit 14 as "position information" in the metadata field 201. Note that the information addition processing in this embodiment is not limited to this. For example, additional information may be added to the image data field 202 using a data hiding technique such as digital watermarking or the like.

The image capturing processing by the image capturing apparatus of the first embodiment will be described below with reference to FIG. 3.

Figure 3:
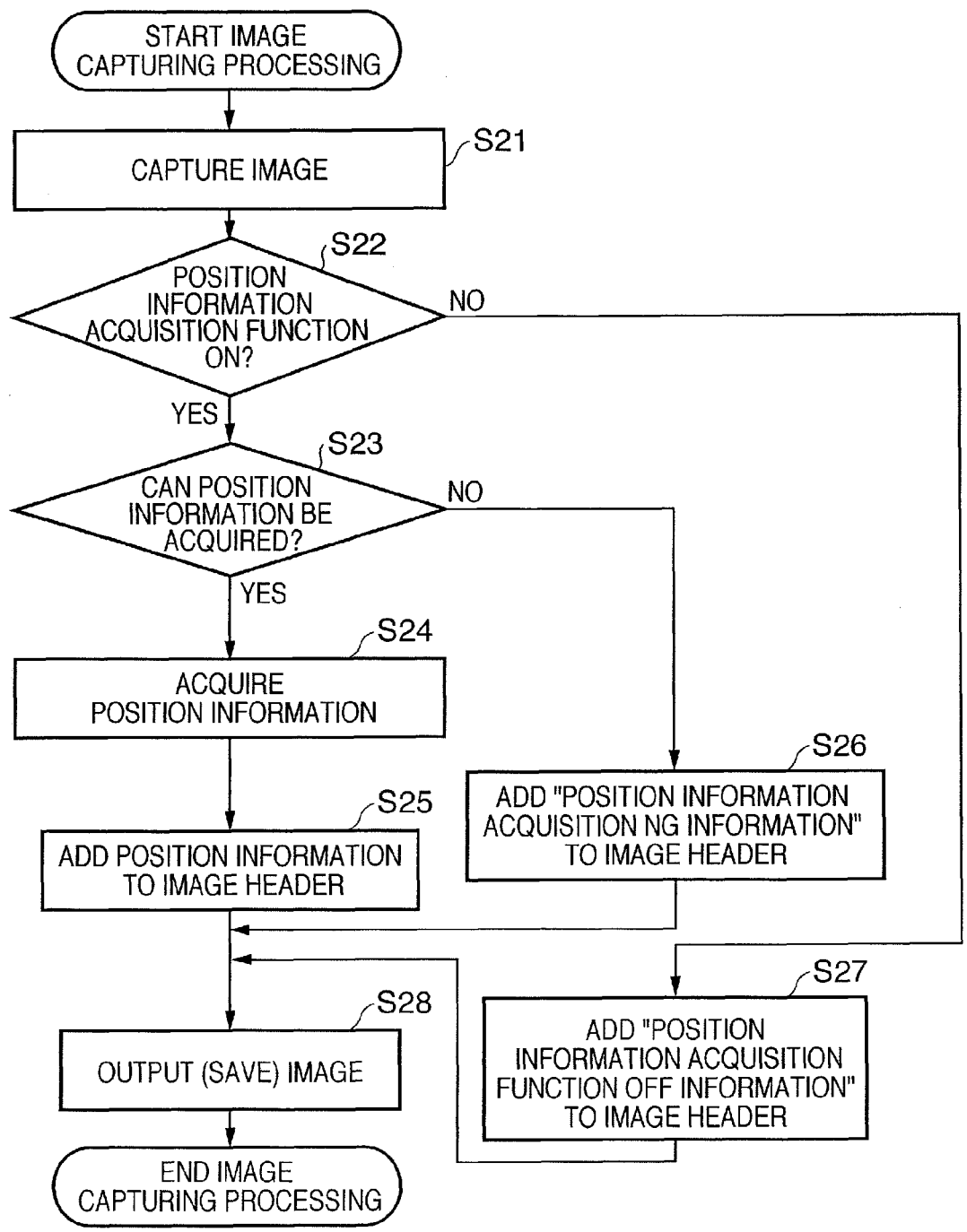
FIG. 3 is a flowchart showing an example of image capturing processing according to the first embodiment of the present invention.

FIG. 3 is a flowchart showing an example of the image capturing processing according to the first embodiment of the present invention.

The image input unit 11 captures and inputs image data (step S21). Next, the setting state by the position information acquisition setting unit 12 is confirmed to see if the position information acquisition function is valid (ON) (step S22). If the position information acquisition function is ON (YES in step S22), the process advances to step S23. On the other hand, if the position information acquisition function is OFF (NO in step S22), the process advances to step S27.

If the position information acquisition function is ON, the position information acquisition unit 13 checks if position information can be acquired (step S23). If position information can be acquired (YES in step S23), the process advances to step S24. On the other hand, if position information cannot be acquired (NO in step S23), the process advances to step S26.

If position information can be acquired, the position information acquisition unit 13 acquires position information (step S24).

The additional information setting unit 14 sets additional information in one of steps S25 to S27 depending on the determination results of steps S22 and S23 described above, that is, the setting state by the position information acquisition setting unit 12 and whether or not position information can be acquired.

If position information can be acquired, the additional information setting unit 14 sets the position information acquired by the position information acquisition unit 13 as additional information, and the information addition unit 15 adds that information to an image file as an image header in step S25.

If position information cannot be acquired, the additional information setting unit 14 sets "position information acquisition NG information" as additional information, and the information addition unit 15 adds that information to an image file as an image header in step S26.

Furthermore, if the position information acquisition function is OFF, the additional information setting unit 14 sets "position information acquisition function OFF information" as additional information, and the information addition unit 15 adds that information to an image file as an image header in step S27.

Finally, the image output unit 16 outputs the image file added with the additional information by the process in one of steps S25 to S27 (step S28).

As described above, according to the first embodiment, one of position information, position information acquisition NG information, and position information acquisition function OFF information is set in the image header of image data. The image capturing position information of the image data can be easily confirmed later based on this image header. When no image capturing position information is added, whether a radio wave could not be received or the photographer did not add any image capturing position information by intent can be discriminated.

Second Embodiment

Since the image capturing apparatus of the first embodiment adds position information to the metadata field 201 shown in FIG. 2, the position information is likely to be easily edited after image capturing. As a result, a malicious user may easily alter or forge image capturing position information, thus posing a problem concerning the reliability of the added image capturing position information in some cases. To solve this problem, the second embodiment will explain a configuration that can avoid alterations and forgeries of image capturing position information, and adds position information with higher reliability.

The configuration of the second embodiment will be described first with reference to FIG. 4.

Figure 4:
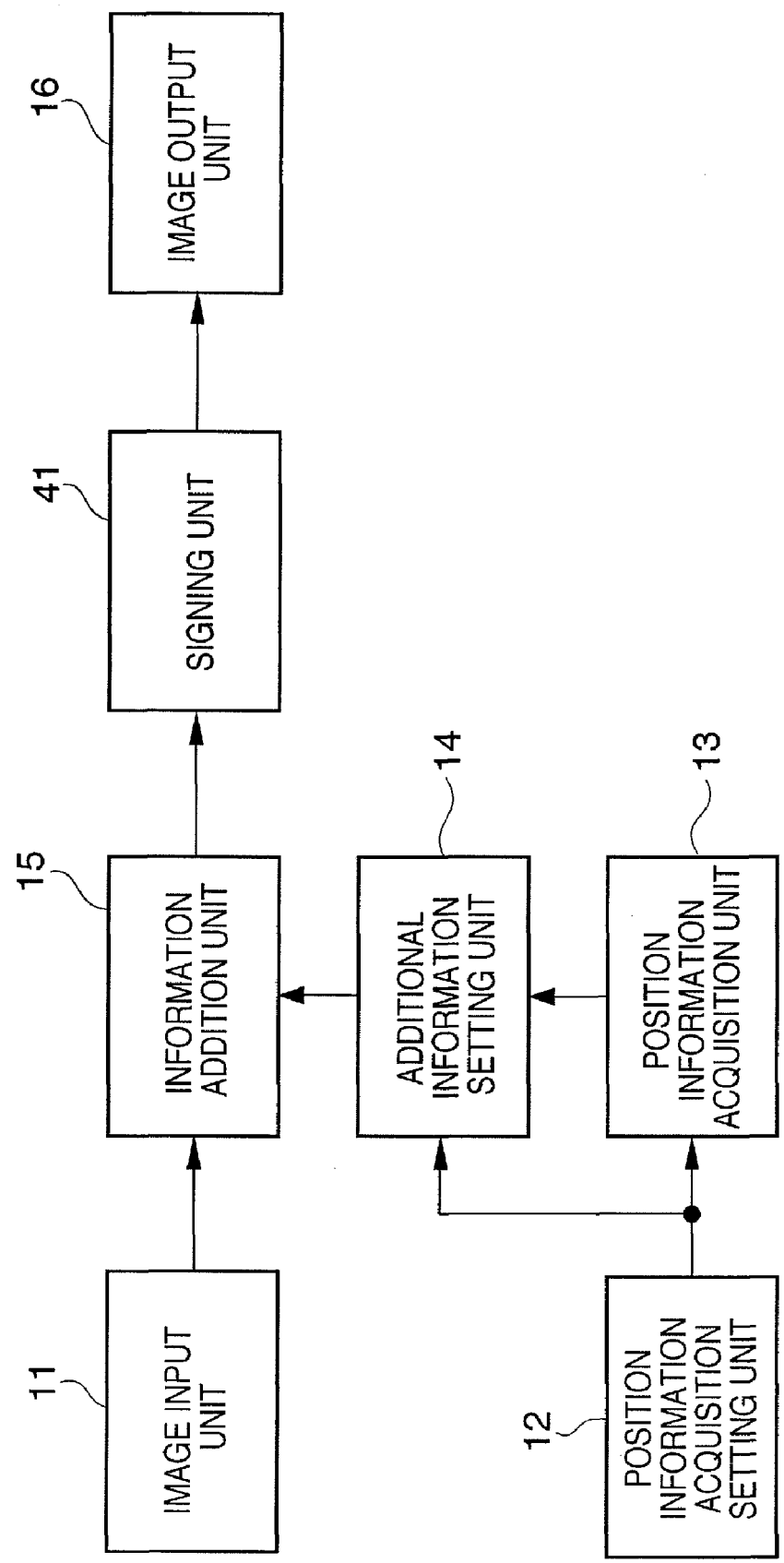
FIG. 4 is a block diagram showing an example of an image capturing apparatus according to the second embodiment of the present invention.

FIG. 4 is a block diagram showing an example of an image capturing apparatus according to the second embodiment of the present invention.

As shown in FIG. 4, the image capturing apparatus of the second embodiment has a configuration in which a signing unit 41 is newly added to the image capturing apparatus shown in FIG. 1 of the first embodiment. Hence, the signing unit 41 will be described below.

The signing unit 41 applies signing processing to an image file output from the information addition unit 15, and outputs the image file that has undergone the signing processing to the image output unit 16.

An example of the signing processing of the second embodiment will be described below with reference to FIGS. 5A to 5C.

Figure 5:
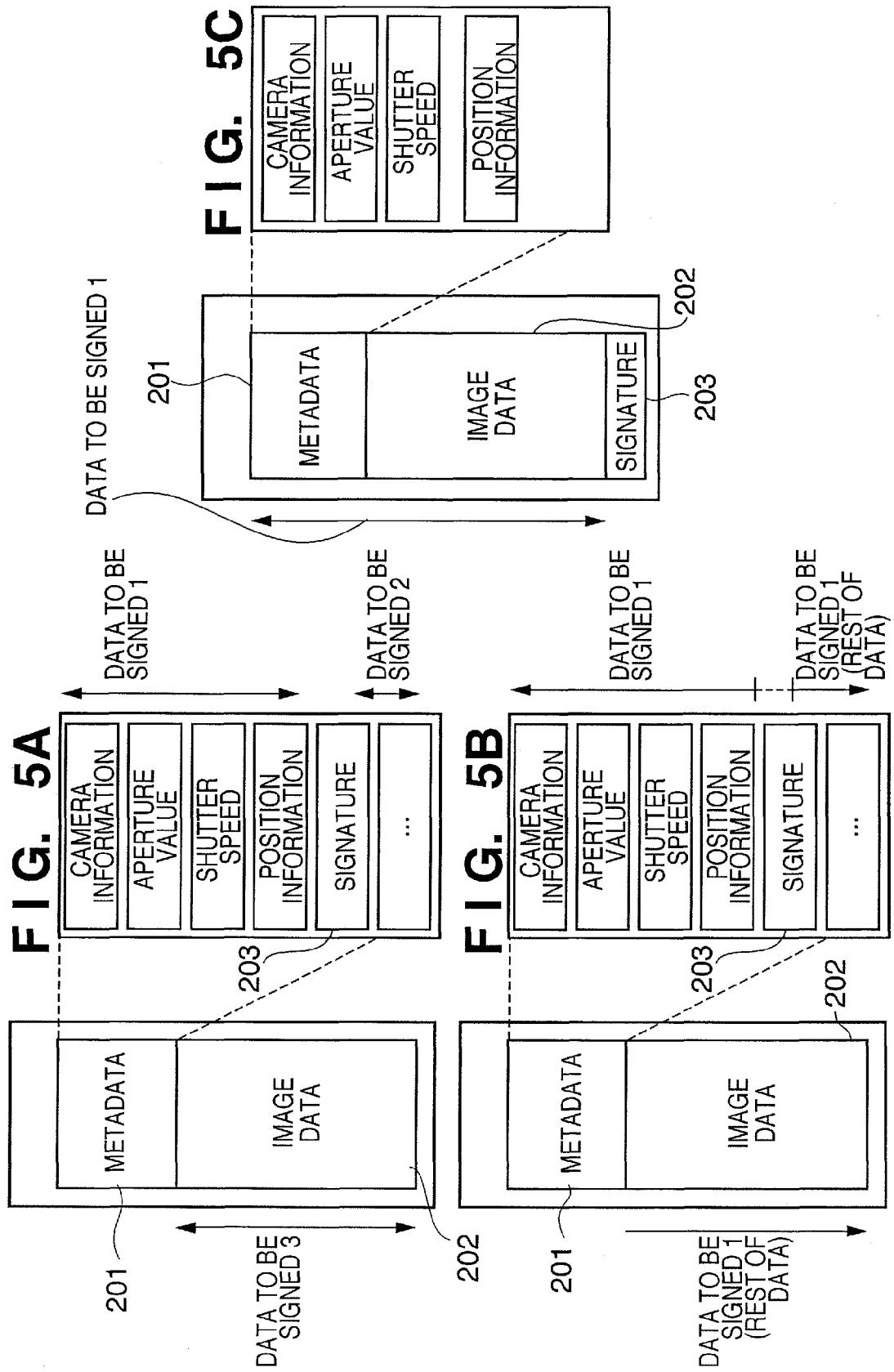
FIGS. 5A to 5C are views for explaining signing processing according to the second embodiment of the present invention.

FIGS. 5A to 5C are views for explaining the signing processing according to the second embodiment of the present invention.

As the signing processing, various kinds of processing can be implemented. In the second embodiment, for example, the signing processing shown in FIGS. 5A to 5C can be executed.

In FIG. 5A, in the metadata field 201, data before a field where signature data is added later are defined as data to be signed 1, data after the field where the signature data is added are defined as data to be signed 2, and data in the image data field 202 is defined as data to be signed 3. Hash values are calculated for respective data to be signed, the three calculated Hash values are combined, and a signature value (signature data) is calculated for the combined Hash value.

In FIG. 5B, from the entire image file, a data field except for a field where signature data is added later is defined as data to be signed 1. A Hash value is calculated for data to be signed 1, and a signature value (signature data) is calculated for the calculated Hash value.

In FIG. 5C, the entire image file is defined as data to be signed 1, a Hash value is calculated for data to be signed 1, and a signature value (signature data) is calculated for the calculated Hash value.

After execution of the signing processing by the methods of FIGS. 5A and 5B, calculated signature data 203 is recorded in the metadata field 201, as shown in FIGS. 5A and 5B. On the other hand, in case of the method of FIG. 5C, the calculated signature data 203 is added before data to be signed 1 or to a field which is not included in data to be signed 1.

Note that the present invention is not particularly limited to the configuration of data to be signed. However, the data to be signed should be configured at least to include position information. As a result, in the event of an alteration of position information, the alteration can be verified later. The data to be signed is preferably configured to include the image data field in addition to the position information. In this way, association between the image data and position information can be verified later.

The present invention is not particularly limited to a scheme required to calculate signature data, and various schemes such as schemes using a public key such as RSA signature, DSA signature, and the like, schemes using private information such as HMAC, CMAC, and the like, and so forth can be applied.

The image capturing processing of the image capturing apparatus of the second embodiment will be described below with reference to FIG. 6.

Figure 6:
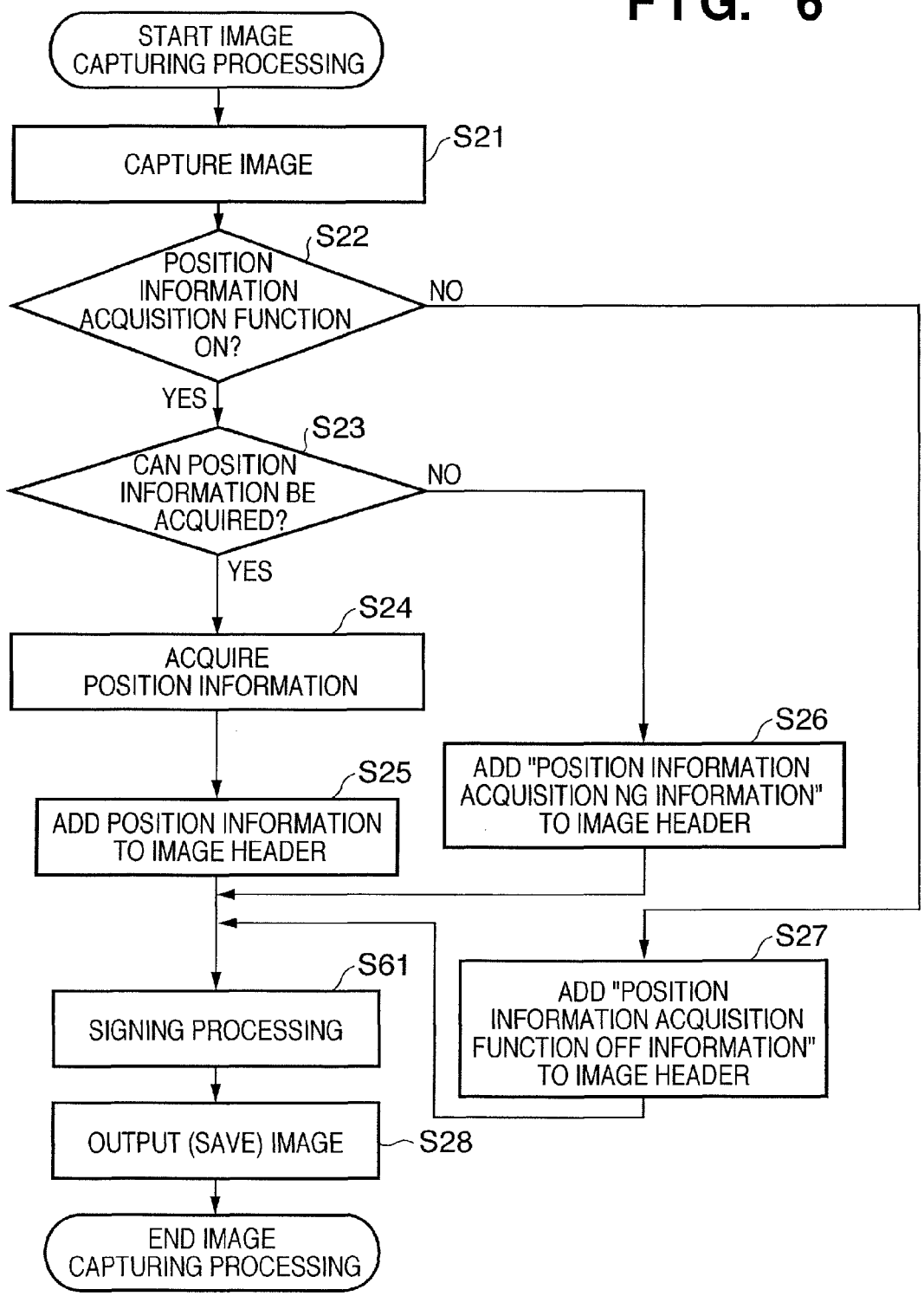
FIG. 6 is a flowchart showing an example of image capturing processing according to the second embodiment of the present invention.

FIG. 6 is a flowchart showing an example of the image capturing processing according to the second embodiment of the present invention.

Note that the same step numbers in FIG. 6 denote the same processes (steps S21 to S28) as those in FIG. 3 of the first embodiment, and a repetitive description thereof will be avoided. In the second embodiment, the signing unit 41 executes the signing processing for an image file to which additional information is added by the process of one of steps S25 to S27 (step S61). Finally, the image output unit 16 outputs the image file that has undergone the signing processing (step S28).

As described above, according to the second embodiment, position information is added at the time of image capturing, and signing processing is applied to image data added with the position information, in addition to the configuration described in the first embodiment. Therefore, by verifying the added signature data, whether or not the position information has been altered can be detected.

As a result, in addition to the effects described in the first embodiment, an image capturing position with higher reliability can be specified. Furthermore, when no image capturing position information is added, whether a radio wave could not be received or the photographer did not add any image capturing position information by intent can be discriminated more reliably.

Third Embodiment

With the image capturing apparatus of the first or second embodiment, when the radio wave receiving condition is bad at the image capturing position, and image capturing position information cannot consequently be acquired, either the "position information acquisition additional information" or "position information acquisition function OFF information" is added to an image file.

By contrast, the third embodiment will explain a configuration that allows specifying image capturing position information more reliably even when position information cannot be acquired at the time of image capturing.

The configuration of the image capturing apparatus of the third embodiment will be described below with reference to FIG. 7.

Figure 7:
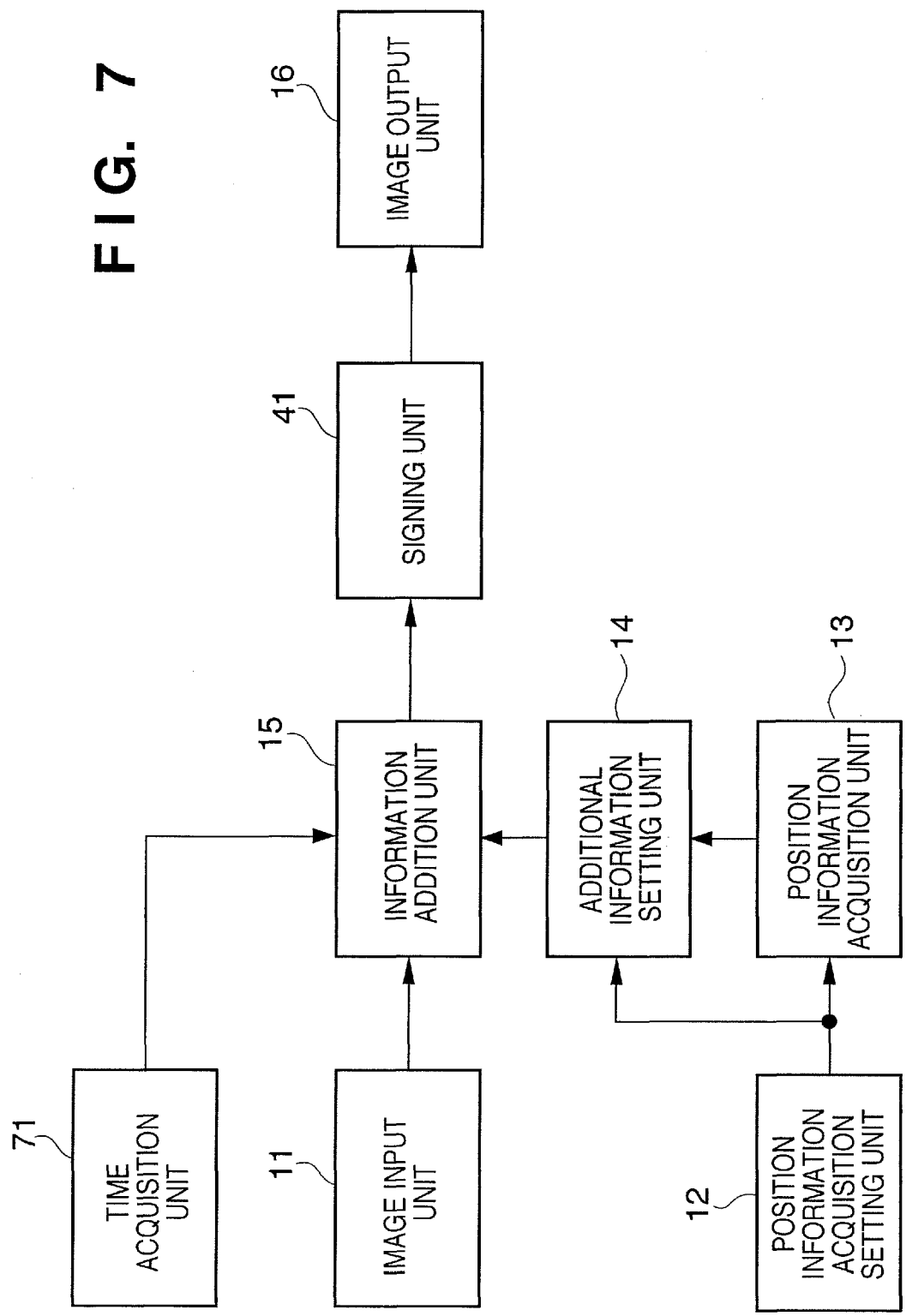
FIG. 7 is a block diagram showing an example of an image capturing apparatus according to the third embodiment of the present invention.

FIG. 7 is a block diagram showing an example of the image capturing apparatus according to the third embodiment of the present invention.

As shown in FIG. 7, the image capturing apparatus of the third embodiment has a configuration in which a time acquisition unit 71 is newly added to the image capturing apparatus shown in FIG. 4 of the second embodiment. Hence, the time acquisition unit 71 will be described below.

The time acquisition unit 71 acquires time information at a designated timing from a timer (not shown), and outputs the acquired time information to the information addition unit 15. Note that the designated timing includes a timing at which the image input unit 11 executes the image input processing, a timing at which the position information acquisition unit 13 executes the position information acquisition processing, and the like.

The image capturing processing of the image capturing apparatus of the third embodiment will be described below with reference to FIG. 8.

Figure 8:
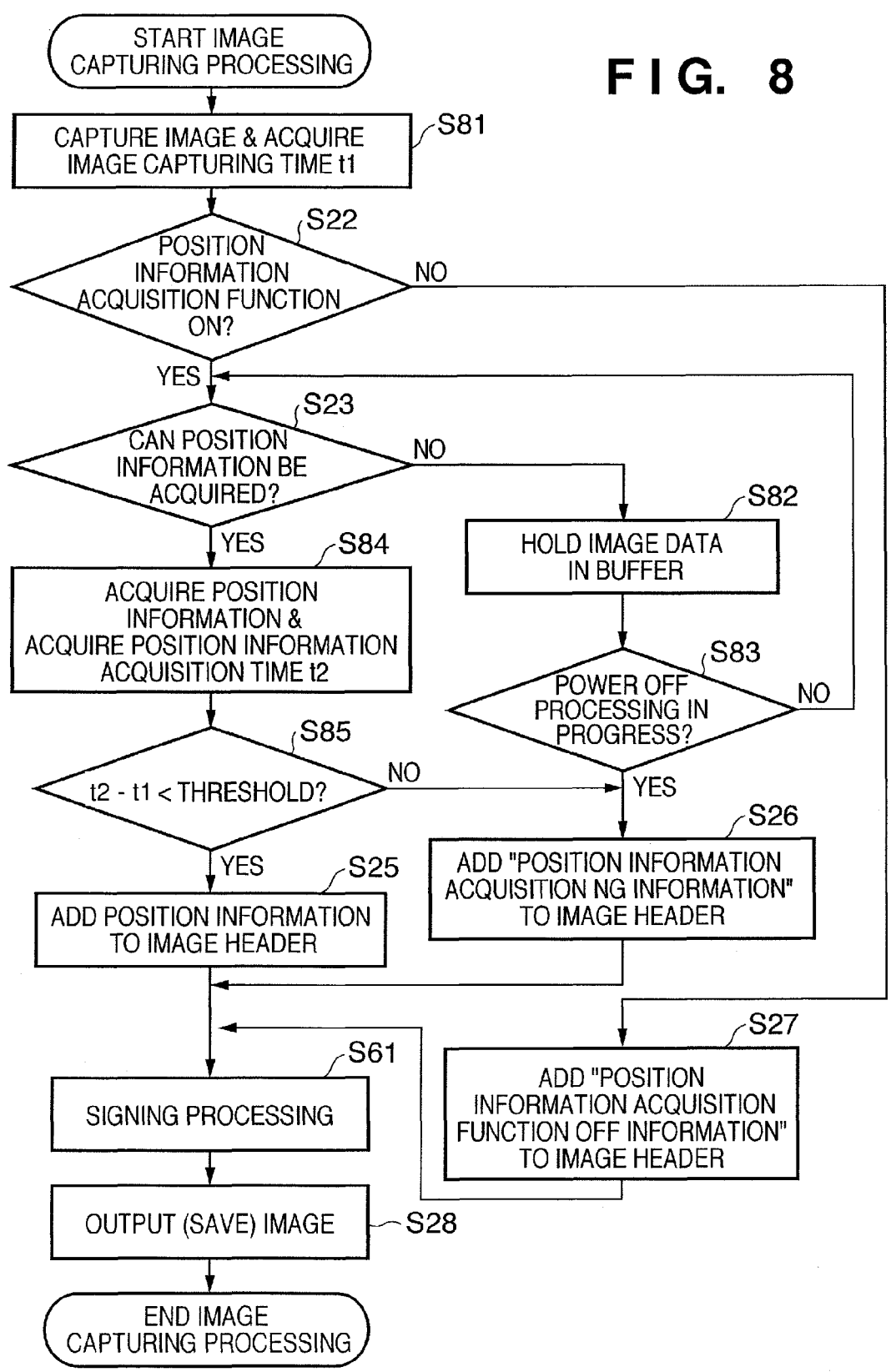
FIG. 8 is a flowchart showing an example of image capturing processing according to the third embodiment of the present invention.

FIG. 8 is a flowchart showing an example of the image capturing processing according to the third embodiment of the present invention.

Note that the same step numbers in FIG. 8 denote the same processes (steps S22, S23, S25 to S28, and S61) as those in FIG. 6 of the second embodiment, and a repetitive description thereof will be avoided.

The image input unit 11 captures and inputs image data, and the time acquisition unit 71 acquires first time information t1 as an image data capturing time (step S81). Next, the setting state by the position information acquisition setting unit 12 is confirmed to see if the position information acquisition function is valid (ON) (step S22). If the position information acquisition function is ON (YES in step S22), the process advances to step S23. On the other hand, if the position information acquisition function is OFF (NO in step S22), the process advances to step S27.

If the position information acquisition function is ON, the position information acquisition unit 13 checks if position information can be acquired (step S23). If position information can be acquired (YES in step S23), the process advances to step S84. On the other hand, if position information cannot be acquired (NO in step S23), the process advances to step S82.

If position information can be acquired, the position information acquisition unit 13 acquires position information, and the time acquisition unit 71 acquires second time information t2 as a position information acquisition time (step S84). After that, the difference between the first time information t1 and second time information t2 is calculated, and it is checked if the calculated value is less than a predetermined threshold (step S85). If the calculated value is less than the threshold (YES in step S85), the process advances to step S25. On the other hand, if the calculated value is equal to or larger than the threshold (NO in step S85), the process advances to step S26.

On the other hand, if position information cannot be acquired, the image data is temporarily held in a buffer (step S82). It is then checked if power OFF processing of the image capturing apparatus is in progress (step S83). If power OFF processing is in progress (YES in step S83), the process advances to step S26. On the other hand, if power OFF processing is not in progress (NO in step S83), the process returns to step S23.

The additional information setting unit 14 sets additional information in any of steps S25 to S27 depending on the determination results of steps S22, S23, S85, and S83 described above.

In the third embodiment, the time acquisition unit 71 (FIG. 7) is configured to acquire the second time information t2. However, the present invention is not limited to this. For example, if the acquired position information includes time information, that time information may be used as the second time information t2.

As described above, according to the third embodiment, even when position information cannot be acquired due to a bad radio wave condition upon image capturing, attempts are made to acquire position information unless the power supply of the image capturing apparatus is turned off, thus reliably adding image capturing position information.

However, if attempts are repeated too many times, the output of image data may be delayed considerably. Hence, when position information cannot be acquired even after a predetermined number of times of attempts, the processing may be aborted at that time.

When the difference between the image capturing time and position information acquisition time is equal to or larger than the threshold, "position information acquisition NG information" is added as additional information. Hence, position information with high reliability (the difference from the image capturing position is not so large) can be added. That is, when position information cannot be received even after an elapse of a predetermined period of time from the image capturing time, the "position information acquisition NG information" can be added.

Furthermore, in the third embodiment, compared to the configuration that adds the image capturing position in Japanese Patent Laid-Open No. 10-56609, position information closer to the actual image capturing position can be added as image capturing position information. This effect will be described in detail below with reference to FIG. 9.

Figure 9:
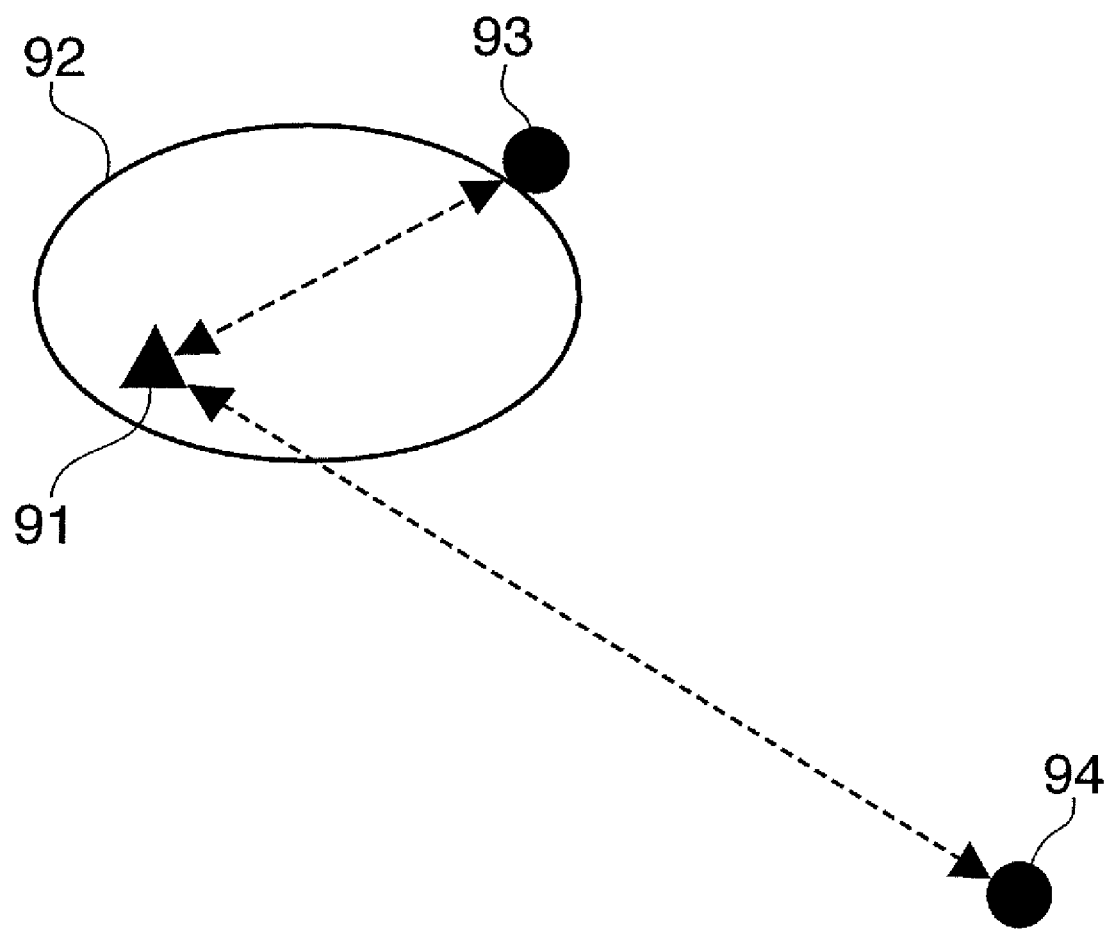
FIG. 9 is a view for explaining the effect according to the third embodiment of the present invention.

FIG. 9 is a view for explaining the effect according to the third embodiment of the present invention.

Referring to FIG. 9, reference numeral 91 denotes an actual image capturing position; 92, an area where position information cannot be acquired; 93, image capturing position information to be added to image data by the third embodiment; and 94, image capturing position information to be added to image data by Japanese Patent Laid-Open No. 10-56609.

As shown in FIG. 9, according to Japanese Patent Laid-Open No. 10-56609, when the image capturing position 91 is included in the area 92, the position where the next image capturing operation is executed is added to image data as previous image capturing position information. For this reason, when a dummy image capturing operation is temporarily executed at a position included in the area 92, and an actual image capturing operation is executed at a desired position later, arbitrary position information can be consequently added as an image capturing position. This is not often suited to, for example, security applications that authenticate the image capturing positions.

On the other hand, in the third embodiment, even when the image capturing position 91 is included in the area 92, position information can be acquired immediately after leaving the area 92 and can be added to image data by repeating steps S23, S82, and S83 in FIG. 8. For this reason, position information closer to an actual image capturing position can be automatically recorded compared to the related art.

Fourth Embodiment

With the image capturing apparatus of the third embodiment, when position information cannot be acquired at the time of image capturing, attempts are repeated to acquire position information until it can be acquired. After the position information can be acquired, a time period elapsed after the image capturing time is measured. If that time period is equal to or longer than a predetermined elapsed time period, "position information acquisition NG information" is added to an image file. If it is less than the predetermined elapsed time period, the acquired position information is added to the image file.

However, the present invention is not limited to such specific processing. For example, only when position information cannot be acquired at the time of image capturing and the elapsed time period is less than the predetermined time period, attempts may be made to acquire position information. Furthermore, if the elapsed time period is equal to or longer than the predetermined elapsed time period, "position information acquisition NG information" is added to an image file. If it is less than the predetermined elapsed time period, the acquired position information can be added to the image file. In the fourth embodiment, a modification of the third embodiment will be explained.

The image capturing apparatus of the fourth embodiment has the same configuration as that of the image capturing apparatus shown in FIG. 7 of the third embodiment, and a description thereof will not be given.

The image capturing processing of the image capturing apparatus of the fourth embodiment will be described below with reference to FIG. 10.

Figure 10:
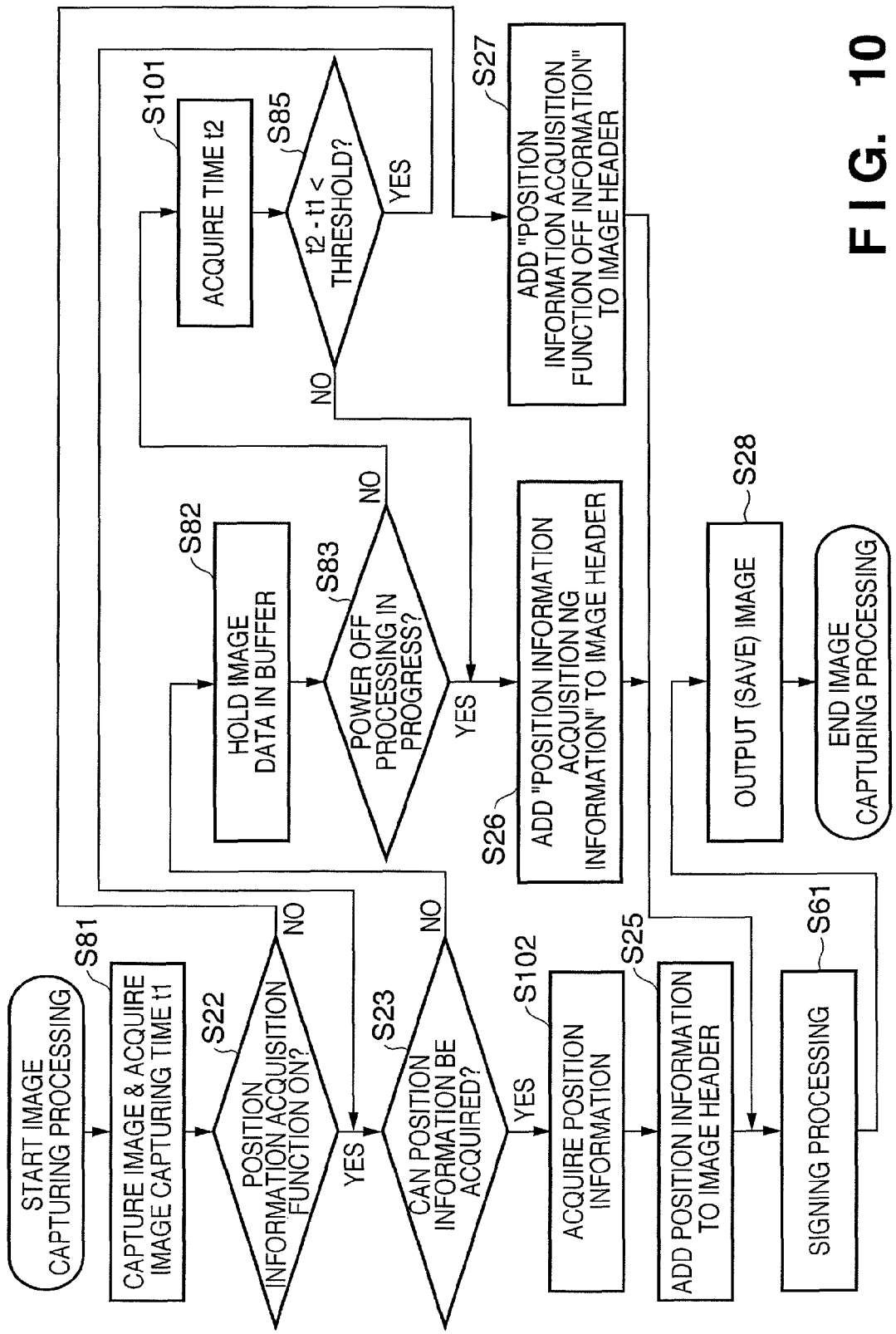
FIG. 10 is a flowchart showing an example of image capturing processing according to the fourth embodiment of the present invention.

FIG. 10 is a flowchart showing an example of the image capturing processing according to the fourth embodiment of the present invention.

Note that the same step numbers in FIG. 10 denote steps common to those in FIG. 8, and a detailed description thereof will not be given.

If position information can be acquired, the position information acquisition unit 13 acquires position information (step S102).

If position information cannot be acquired, the image data is temporarily held in a buffer (step S82). It is then checked if power OFF processing of the image capturing apparatus is in progress (step S83). If power OFF processing is in progress (YES in step S83), the process advances to step S26. On the other hand, if power OFF processing is not in progress (NO in step S83), the process returns to step S101.

If the power OFF processing is not in progress, the time acquisition unit 71 acquires second time information t2 (step S101). After that, the difference between the first time information t1 and second time information t2 is calculated, and it is checked if the calculated value is less than a predetermined threshold (step S85). If the calculated value is less than the threshold (YES in step S85), the process returns to step S23. On the other hand, if the calculated value is equal to or larger than the threshold (NO in step S85), the process advances to step S26.

The additional information setting unit 14 sets additional information in any of steps S25 to S27 depending on the determination results of steps S22, S23, S83, and S85 described above.

As described above, according to the fourth embodiment, even when position information cannot be acquired due to a bad radio wave condition at the time of image capturing, image capturing position information can be added reliably. When a predetermined period of time has elapsed after the image capturing time, acquisition of position information is stopped, thus executing acquisition of position information more efficiently.

Upon conceptually acquiring a configuration including those of both the third and fourth embodiments, the third and fourth embodiments include at least a first time acquisition unit which acquires a first time at which image data is input, and a measurement unit which measures a time period elapsed after the first time. Then, additional information to be added to the input image data is set according to the measurement result of this measurement unit.

The third embodiment further comprises a second time acquisition unit which acquires a second time at which position information is acquired. With the configuration of the third embodiment, when position information can be acquired, the measurement unit calculates the difference between the first and second times, and outputs the calculated value as the measurement result.

Also, the fourth embodiment further comprises a second time acquisition unit which acquires a second time after the processing for checking whether or not position information can be acquired. With the configuration of the fourth embodiment, when it is determined that position information cannot be acquired, the measurement unit calculates the difference between the first and second times, and outputs the calculated value as the measurement result.

Fifth Embodiment

In the fourth embodiment, when position information cannot be acquired at the time of image capturing, the contents of additional information to be added are controlled according to a time period elapsed from the image capturing time. That is, when the difference between the image capturing time and position information acquisition time is large, it is determined that the reliability of position information is low, and "position information acquisition NG information" is added to an image file in place of position information.

However, the present invention is not limited to this. For example, an image capturing time and position information acquisition time may be recorded in an image file at the time of image capturing, and when the image capturing position information is verified, the reliability may be calculated based on the image capturing time and position information acquisition time. In the fifth embodiment, this configuration will be explained.

Since the image capturing apparatus of the fifth embodiment has the same configuration as that of the image capturing apparatus shown in FIG. 7 of the third embodiment, a description thereof will not be given.

The image capturing processing of the image capturing apparatus of the fifth embodiment will be described below with reference to FIG. 11.

Figure 11:
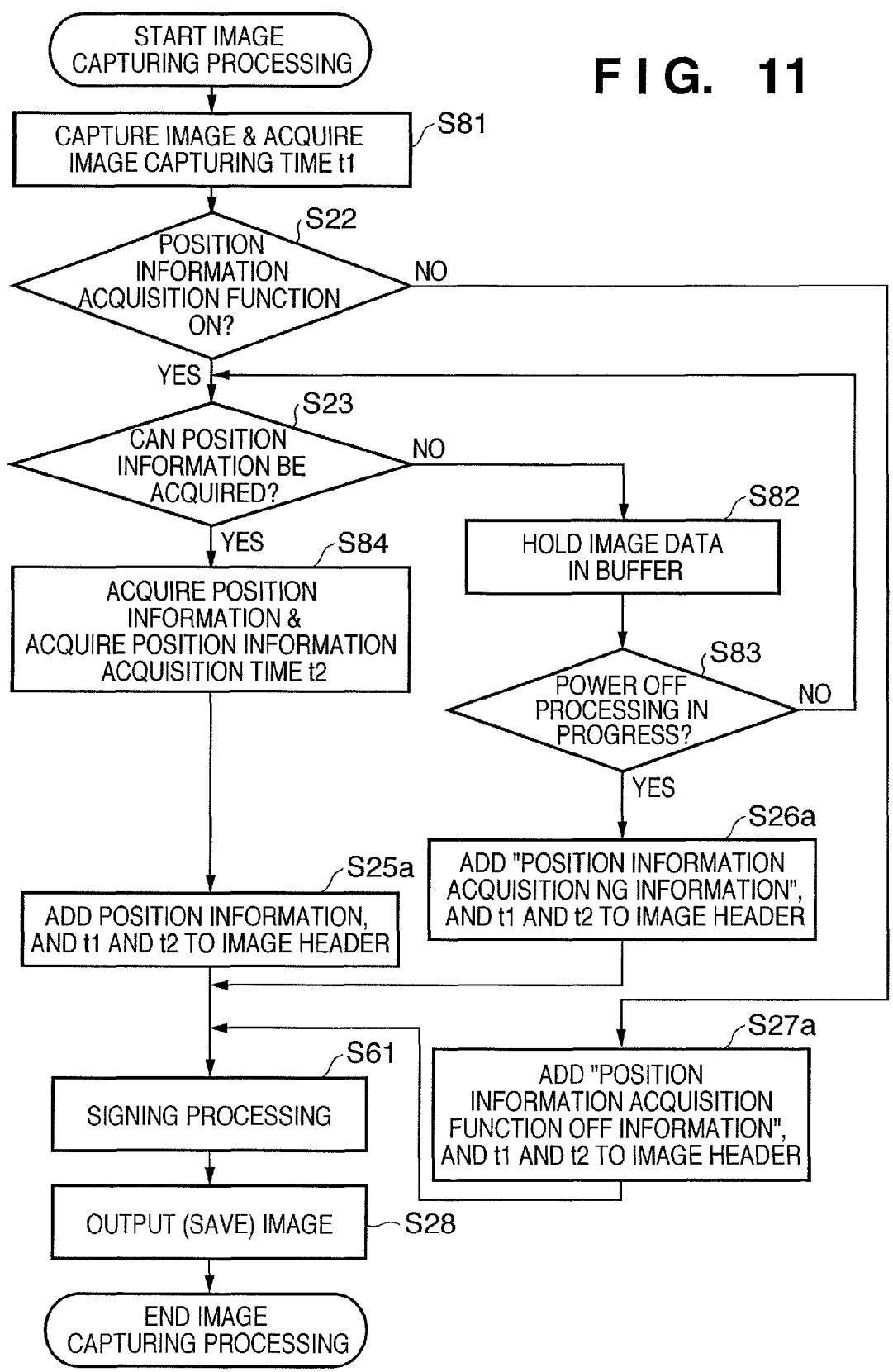
FIG. 11 is a flowchart showing an example of image capturing processing according to the fifth embodiment of the present invention.

FIG. 11 is a flowchart showing an example of the image capturing processing according to the fifth embodiment of the present invention.

Note that the same step numbers in FIG. 11 denote steps common to those in FIG. 8, and a detailed description thereof will not be given. Especially, in FIG. 11, step S85 in FIG. 8 is omitted, and steps S25a to S27a are executed in place of steps S25 to S27.

More specifically, the additional information setting unit 14 sets additional information in one of steps S25a to S27a in accordance with the determination results in steps S22, S23, and S83.

If position information can be acquired, the additional information setting unit 14 sets, as additional information, the position information acquired by the position information acquisition unit 13, and first time information (image capturing time information) t1 and second time information (position information acquisition time) t2 in step S25a. Then, the information addition unit 15 adds that additional information to an image file.

If position information cannot be acquired, the additional information setting unit 14 sets, as additional information, "position information acquisition NG information", and first time information (image capturing time information) t1 and second time information (position information acquisition time) t2 in step S26a. Then, the information addition unit 15 adds that additional information to an image file.

Furthermore, if the position information acquisition function is not valid (ON), the additional information setting unit 14 sets, as additional information, "position information acquisition function OFF information", and first time information (image capturing time information) t1 and second time information (position information acquisition time) t2 in step S27a. Then, the information addition unit 15 adds that additional information to an image file.

The signing unit 41 applies signing processing to the image file to which the additional information is added by one of the processes in steps S25a to S27a (step S61). Finally, the image output unit 16 outputs the image file that has undergone the signing processing (step S28).

The configuration of a verification apparatus which verifies the image capturing position information in the image file obtained by the processing in FIG. 11 will be described below with reference to FIG. 12.

Figure 12:
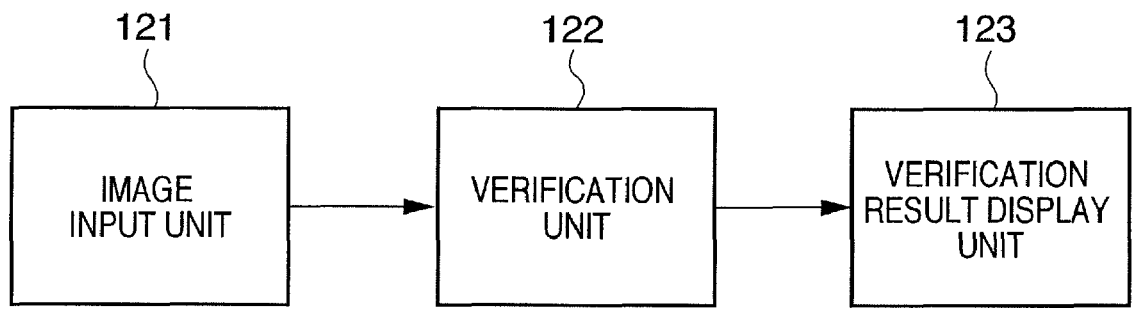
FIG. 12 is a block diagram showing an example of a verification apparatus according to the fifth embodiment of the present invention.

FIG. 12 is a block diagram showing an example of the verification apparatus according to the fifth embodiment of the present invention.

As shown in FIG. 12, the verification apparatus of the fifth embodiment comprises an image input unit 121, verification unit 122, and verification result display unit 123.

The image input unit 121 inputs an image file captured by the image capturing apparatus. For example, this image data is that output from the image output unit 16 in FIG. 7.

The verification unit 122 calculates the reliability of image capturing position information using the image capturing position information, first time information t1, second time information t2, and signature data added to the input image data, and outputs the calculated reliability. Details of the reliability calculation processing will be described later.

The verification result display unit 123 displays the input reliability on a display unit such as a display or the like.

The image capturing position verification processing by the verification apparatus of the fifth embodiment will be described below with reference to FIG. 13.

Figure 13:
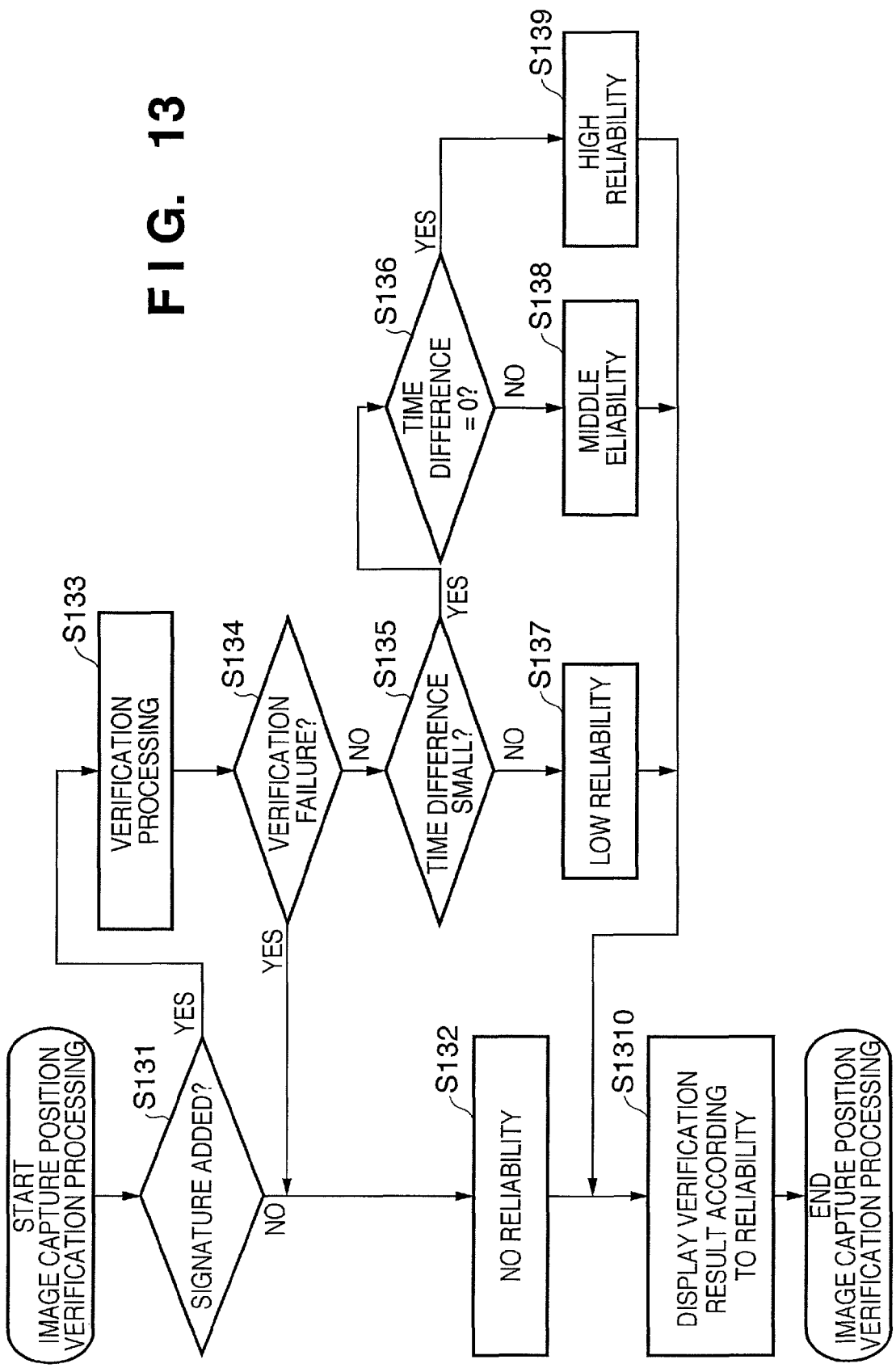
FIG. 13 is a flowchart showing an example of image capturing position verification processing according to the fifth embodiment of the present invention.

FIG. 13 is a flowchart showing an example of the image capturing position verification processing according to the fifth embodiment of the present invention.

The verification unit 122 checks if signature data is added to image data input from the image input unit 121 (step S131). If signature data is added (YES in step S131), the process advances to step S133. On the other hand, if signature data is not added (NO in step S131), the process advances to step S132.

If signature data is added, the verification unit 122 executes verification processing of the signature data using that signature data (step S133). Since this signature data verification processing is a technique known to those who are skilled in the art, a detailed description thereof will not be given. The verification unit 122 checks based on the result of the signature data verification processing if verification has failed (step S134).

If verification has failed (YES in step S134), the process advances to step S132. If verification has succeeded (NO in step S134), the process advances to step S135.

If the verification of the signature data has succeeded, the verification unit 122 calculates the difference between the first and second times t1 and t2 added to the image data, and checks if the calculated time difference is less than a threshold. If the time difference is equal to or larger than the threshold (NO in step S135), the process advances to step S137. On the other hand, if the time difference is less than the threshold (YES in step S135), the process advances to step S136.

If the time difference is less than the threshold, the verification unit 122 checks if the calculated time difference is zero (step S136). If the time difference is not zero (NO in step S136), the process advances to step S138. On the other hand, if the time difference is zero (YES in step S136), the process advances to step S139.

The verification unit 122 calculates the reliability of the added image capturing time in accordance with the determination results in steps S131, S134, S135, and S136.

If signature data is not added or if verification of the signature data has failed, the verification unit 122 determines "no reliability" as the reliability in step S132.

If the time difference is equal to or larger than the threshold, the verification unit 122 determines "low reliability" as the reliability in step S137.

If the time difference is less than the threshold but it is not zero, the verification unit 122 determines "middle reliability" as the reliability in step S138.

If the time difference is zero, the verification unit 122 determines "high reliability" as the reliability in step S139.

Note that the levels of reliability are "high reliability">"middle reliability">"low reliability">"no reliability".

The verification result display unit 123 displays the reliability determined in one of steps S132, and S137 to S139 (step S1310).

In the fifth embodiment, the first time information t1 and second time information t2 are added as additional information in steps S25a, S26a, and S27a in FIG. 11. However, the present invention is not limited to this. For example, the difference between the first time information t1 and second time information t2 may be calculated, and the calculated time difference information may be added. In this case, in step S135 in FIG. 13 the verification unit 122 can make determination using the added time difference information in place of calculating the difference between the first time information t1 and second time information t2.

As described above, according to the fifth embodiment, since information that allows verifying the reliability of image data is added to the image data, the reliability of the image data can be independently verified using the additional data. Particularly, in the fifth embodiment, since the need for calculating the difference between the first time information t1 and second time information t2 and making determination based on the difference can be obviated compared to the configuration of the fourth embodiment, the processing load on the image capturing apparatus can be reduced.

As described above, according to the present invention, when position information is not added to captured image data, whether the image capturing position information recording function was not set or position information could not be received at the time of image capturing can be identified. Even when position information could not be acquired at the time of image capturing, position information with high precision can be automatically added to as many images as possible.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-313599 filed on Nov. 20, 2006, which is hereby incorporated by reference herein in its entirety.

What is claimed is:

1. An information processing apparatus which inputs image data, adds additional information to the input image data, and outputs the image data, comprising:
   input means for inputting image data;
   acquisition means for acquiring position information indicating a geographical position of said information processing apparatus;
   setting means for setting an on state in which position information acquisition processing by said acquisition means is executed and for setting an off state in which position information acquisition processing by said acquisition means is not executed;
   determination means for determining whether or not position information can be acquired by said acquisition means;
   additional information setting means for
   1) when said setting means sets the state of the position information acquisition processing by said acquisition means to the off state, setting first information indicating that the position information acquisition processing by the acquisition means is in the off state as the additional information, 2) when said determination means determines that the position information cannot be acquired, setting second information indicating that the position information cannot be acquired as the additional information, and 3) when said setting means sets the state of the position information acquisition processing by said acquisition means to the on state, and said determination means determines that the position information can be acquired, setting the position information acquired by said acquisition means as the additional information, and addition means for adding the additional information set by said additional information setting means to the image data, wherein the first information and the second information are distinguishable from each other.

2. The apparatus according to claim 1, further comprising signing means for executing signing processing to the image data to which the additional information is added by said addition means.

3. The apparatus according to claim 1, further comprising:
first time acquisition means for acquiring a first time at which said input means inputs the image data; and
measurement means for measuring a time period elapsed from the first time,
wherein said additional information setting means sets the additional information to be added to the image data input by said input means in accordance with the setting by said setting means, the determination result of said determination means, and a measurement result by said measurement means.

4. The apparatus according to claim 3, further comprising second time acquisition means for acquiring a second time at which said acquisition means acquires the position information,
wherein when said determination means determines that the position information can be acquired, said measurement means calculates a difference between the first time and the second time, and outputs the calculated value as a measurement result.

5. The apparatus according to claim 3, further comprising second time acquisition means for acquiring a second time after the determination processing by said determination means,
wherein when said determination means determines that the position information cannot be acquired, said measurement means calculates a difference between the first time and the second time, and outputs the calculated value as a measurement result.

6. The apparatus according to claim 1, wherein when said determination means determines that the position information cannot be acquired, said acquisition means repetitively executes reception of the position information.

7. The apparatus according to claim 1, further comprising:
first time acquisition means for acquiring a first time at which said input means inputs the image data; and
second time acquisition means for acquiring a second time at which said acquisition means acquires the position information,
wherein said additional information setting means sets, as the additional information, the position information acquired by said acquisition means, and time information according to the first time and the second time.

8. An information processing apparatus for verifying reliability of the position information in an information processing apparatus according to claim 7, comprising:
input means for inputting the image data added with the additional information;
determination means for determining whether or not signature data is added to the image data;
verification means for executing verification processing of the signature data;
calculation means for calculating a difference between the first time and the second time using time information included in the additional information;
reliability determination means for determining reliability of the position information in accordance with a determination result of said determination means, a verification result of said verification means, and a calculation result of said calculation means; and
display means for displaying a determination result of said reliability determination means.

9. A method of controlling an information processing apparatus, which inputs image data, adds additional information to the input image data, and outputs the image data, comprising:
an input step of inputting image data;
an acquisition step of acquiring position information indicating a geographical position of the information processing apparatus;
a setting step of setting an on state in which position information acquisition processing by said acquisition step is executed and setting an off state in which position information acquisition processing by said acquisition step is not executed;
a determination step of determining whether or not position information can be acquired in the acquisition step;
an additional information setting step of
1) when said setting step sets the state of the position information acquisition processing by said acquisition step to the off state, setting first information indicating that the position information acquisition processing by the acquisition step is in the off state as the additional information,
2) when said determination step determines that the position information cannot be acquired, setting second information indicating that the position information cannot be acquired as the additional information, and
3) when said setting step sets the state of the position information acquisition processing by said acquisition step to the on state, and said determination step determines that the position information can be acquired, setting the position information acquired by said acquisition step as the additional information, and
an addition step of adding the additional information set in the additional information setting step to the image data,
wherein the first information and the second information are distinguishable from each other.

10. A non-transitory computer readable storage medium for storing a program for making a computer execute control of an information processing apparatus, which inputs image data, adds additional information to the input image data, and outputs the image data, said program making the computer execute:
an input step of inputting image data;
an acquisition step of acquiring position information indicating a geographical position of the information processing apparatus;

a setting step of setting an on state in which position information acquisition processing by said acquisition step is executed and setting an off state in which position information acquisition processing by said acquisition step is not executed;

a determination step of determining whether or not position information can be acquired in the acquisition step;

an additional information setting step of
1) when said setting step sets the state of the position information acquisition processing by said acquisition step to the off state, setting first information indicating that the position information acquisition processing by the acquisition step is in the off state as the additional information,
2) when said determination step determines that the position information cannot be acquired, setting second information indicating that the position information cannot be acquired as the additional information, and
3) when said setting step sets the state of the position information acquisition processing by said acquisition step to the on state, and said determination step determines that the position information can be acquired, setting the position information acquired by said acquisition step as the additional information, and an addition step of adding the additional information set in the additional information setting step to the image data, wherein the first information and the second information are distinguishable from each other.

11. The apparatus according to claim 1, wherein said addition means adds either the first information or the second information to the image data if the position information is not added to the image data by the addition means.

12. The method according to claim 9, wherein said addition step adds either the first information or the second information to the image data if the position information is not added to the image data in the addition step.

13. The medium according to claim 10, wherein said addition step adds either the first information or the second information to the image data if the position information is not added to the image data in the addition step.

14. An information processing apparatus which inputs image data, adds additional information to the input image data, and outputs the image data, comprising:

input means for inputting image data;

acquisition means for acquiring position information indicating a geographical position of said information processing apparatus;

setting means for setting a state of said apparatus in which the position information is to be added to the input image data as the additional information and a state of said apparatus in which the position information is not be added to the input image data as the additional information;

determination means for determining whether or not position information can be acquired by said acquisition means;

additional information setting means for
1) when said setting means sets the state of said apparatus in which the position information is not set be added to the input image data as the additional information, setting first information indicating that the position information is not added as the additional information,
2) when said determination means determines that the position information cannot be acquired, setting second information indicating that the position information cannot be acquired as the additional information, and
3) when said setting means sets the state of said apparatus in which the positional information is to be added to the input image data as the additional information and said determination means determines that the position information can be acquired, setting the position information acquired by said acquisition means as the additional information, and addition means for adding the additional information set by said additional information setting means to the image data, wherein the first information and the second information are distinguishable from each other.

15. The apparatus according to claim 14, further comprising signing means for executing signing processing to the image data to which the additional information is added by said addition means.

16. The apparatus according to claim 14, wherein said addition means adds either the first information or the second information to the image data if the position information is not added to the image data by the addition means.

17. An information processing method for an information processing apparatus that inputs image data, adds additional information to the input image data, and outputs the image data, comprising the steps of:

inputting the image data;

acquiring position information indicating a geographical position of the information processing apparatus;

setting a state of the apparatus in which the position information is to be added to the input image data as the additional information and a state of the apparatus in which the position information is not be added to the input image data as the additional information;

determining whether or not position information can be acquired by said acquisition step;

setting additional information by
1) when said setting step sets the state of the apparatus in which the position information is not set be added to the input image data as the additional information, setting first information indicating that the position information is not added as the additional information,
2) when the determining step determines that the position information cannot be acquired, setting second information indicating that the position information cannot be acquired as the additional information, and
3) when said setting step sets the state of the apparatus in which the positional information is to be added to the input image data as the additional information and said determining step determines that the position information can be acquired, setting the position information acquired by said acquisition step as the additional information, and adding the additional information set by said additional information setting step to the image data, wherein the first information and the second information are distinguishable from each other.

18. The method according to claim 17, further comprising the step of executing signing processing to the image data to which the additional information is added by said addition step.

19. The method according to claim 17, wherein said addition step adds either the first information or the second information to the image data if the position information is not added to the image data by the addition step.

20. A non-transitory computer-readable storage medium storing a program for instructing a computer to perform an information processing method for an information processing apparatus that inputs image data, adds additional information to the input image data, and outputs the image data, comprising the steps of:

inputting the image data;

acquiring position information indicating a geographical position of the information processing apparatus;

setting a state of the apparatus in which the position information is to be added to the input image data as the additional information and a state of the apparatus in which the position information is not be added to the input image data as the additional information;

determining whether or not position information can be acquired by said acquisition step;

setting additional information by
1) when said setting step sets the state of the apparatus in which the position information is not set be added to the input image data as the additional information, setting first information indicating that the position information is not added as the additional information,
2) when the determining step determines that the position information cannot be acquired, setting second information indicating that the position information cannot be acquired as the additional information, and
3) when said setting step sets the state of the apparatus in which the positional information is to be added to the input image data as the additional information and said determining step determines that the position information can be acquired, setting the position information acquired by said acquisition step as the additional information, and adding the additional information set by said additional information setting step to the image data, wherein the first information and the second information are distinguishable from each other.

21. An information processing apparatus which inputs image data, adds additional information to the input image data, and outputs the image data, comprising:

an input unit configured to input image data;

an acquisition unit configured to acquire position information indicating a geographical position of said information processing apparatus;

a setting unit configured to set a state of said apparatus in which the position information is to be added to the input image data as the additional information and a state of said apparatus in which the position information is not be added to the input image data as the additional information;

a determination unit configured to determine whether or not position information can be acquired by said acquisition unit;

an additional information setting unit configured to
1) when said setting unit sets the state of said apparatus in which the position information is not set be added to the input image data as the additional information, set first information indicating that the position information is not added as the additional information,
2) when said determination unit determines that the position information cannot be acquired, set second information indicating that the position information cannot be acquired as the additional information, and
3) when said setting unit sets the state of said apparatus in which the positional information is to be added to the input image data as the additional information and said determination unit determines that the position information can be acquired, set the position information acquired by said acquisition unit as the additional information, and an addition unit configured to add the additional information set by said additional information setting unit to the image data, wherein the first information and the second information are distinguishable from each other.

22. An information processing apparatus which inputs image data, adds additional information to the input image data, and outputs the image data, comprising:

an input unit configured to input image data;

an acquisition unit configured to acquire position information indicating a geographical position of said information processing apparatus;

a setting unit configured to set an on state in which position information acquisition processing by said acquisition unit is executed and for setting an off state in which position information acquisition processing by said acquisition unit is not executed;

a determination unit configured to determine whether or not position information can be acquired by said acquisition unit;

an additional information setting unit configured to
1) when said setting unit sets the state of the position information acquisition processing by said acquisition unit to the off state, setting first information indicating that the position information acquisition processing by the acquisition unit is in the off state as the additional information,
2) when said determination unit determines that the position information cannot be acquired, setting second information indicating that the position information cannot be acquired as the additional information, and
3) when said setting unit sets the state of the position information acquisition processing by said acquisition unit to the on state, and said determination unit determines that the position information can be acquired, setting the position information acquired by said acquisition unit as the additional information, and an addition unit configured to add the additional information set by said additional information setting unit to the image data, wherein the first information and the second information are distinguishable from each other.

* * * * *